(12) United States Patent
Kroner

(10) Patent No.: US 8,087,167 B2
(45) Date of Patent: Jan. 3, 2012

(54) METHOD FOR THE PRODUCTION OF AN EXHAUST GAS CONDUCTING DEVICE, ESPECIALLY AN EXHAUST GAS PURIFYING DEVICE FOR A VEHICLE

(75) Inventor: Peter Kroner, Augsburg (DE)

(73) Assignee: EMCON Technologies Germany (Augsburg) GmbH, Augsburg (DE)

( * ) Notice: Subject to any disclaimer, the term of this patent is extended or adjusted under 35 U.S.C. 154(b) by 929 days.

(21) Appl. No.: 11/817,889

(22) PCT Filed: Jul. 11, 2005

(86) PCT No.: PCT/EP2005/007500
§ 371 (c)(1),
(2), (4) Date: Mar. 18, 2008

(87) PCT Pub. No.: WO2006/094534
PCT Pub. Date: Sep. 14, 2006

(65) Prior Publication Data
US 2008/0201949 A1 Aug. 28, 2008

(30) Foreign Application Priority Data
Mar. 7, 2005 (DE) .......................... 10 2005 010 267

(51) Int. Cl.
*B23P 17/00* (2006.01)
(52) U.S. Cl. ........... 29/890.08; 29/890; 29/446; 29/451; 29/464
(58) Field of Classification Search .................... 29/890, 29/890.08, 446, 451, 464, 428, 505
See application file for complete search history.

(56) References Cited

U.S. PATENT DOCUMENTS

| | | | | |
|---|---|---|---|---|
| 6,299,843 | B1 * | 10/2001 | Locker et al. | 422/179 |
| 6,701,617 | B2 * | 3/2004 | Li et al. | 29/890 |
| 6,769,281 | B2 * | 8/2004 | Irie et al. | 72/121 |
| 2003/0167854 | A1 * | 9/2003 | Irie et al. | 73/818 |

FOREIGN PATENT DOCUMENTS

| | | |
|---|---|---|
| EP | 1 344 911 | 9/1703 |
| EP | 1344911 | 9/2003 |
| EP | 1 387 931 | 2/2004 |
| EP | 1 635 048 | 3/2006 |
| WO | 0037781 | 6/2000 |
| WO | WO 00/37781 A | 6/2000 |
| WO | 2006094534 | 9/2006 |

OTHER PUBLICATIONS

PCT International Search Report for PCT/EP2005/007500 completed by the EP Searching Authority on Nov. 24, 2005.
Examination Report Dated Feb. 2, 2011.

* cited by examiner

*Primary Examiner* — Derris Banks
*Assistant Examiner* — Azm Parvez
(74) *Attorney, Agent, or Firm* — Pamela Kachur

(57) ABSTRACT

In a method of fabricating an exhaust gas handling device, particularly an automotive emission control device, an insert, for example comprising a substrate and a support matting, is sensed as to its specific elasticity before it is clamped in place in an outer housing. For sensing, the insert is pressurized from without in a sensing station. Via the applied pressure and the displacement of the sensing tool the displacement of the insert at which it is to be clamped in place in the outer housing is determined. Then, the insert is fitted in an outer housing the inner dimensions of which correspond to the previously sensed wanted outer dimensions of the insert in the wanted compression.

20 Claims, 4 Drawing Sheets

METHOD FOR THE PRODUCTION OF AN EXHAUST GAS CONDUCTING DEVICE, ESPECIALLY AN EXHAUST GAS PURIFYING DEVICE FOR A VEHICLE

CROSS REFERENCE TO RELATED APPLICATIONS

This application is a U.S. national counterpart application of international application Ser. No. PCT/EP2005/007500 filed Jul. 11, 2005, which claims priority to German Patent Application No. 102005010267.0 filed Mar. 7, 2005. The entirety of both of which is hereby incorporated by reference.

TECHNICAL FIELD

The invention relates to a method of fabricating exhaust gas handling devices, particularly emission control devices each comprising an outer housing with an insert clamped in place therein.

BACKGROUND

The exhaust gas handling devices involved in the invention are, for example, silencers, but particularly emission control devices such as catalysts and Diesel particle filters.

Housed in such devices are inserts highly sensitive to radial pressure, these mainly involving hitherto ceramic substrates wrapped in an elastic compensating element (e.g. in the form of a matting). These inserts are, when possible, held in place both axially and laterally simply by being radially clamped in place whereby the clamping effect needs to be sufficient so that the insert is not shifted out of place relative to the outer housing axially due to the gas pressure and also due to vibrations in vehicle operation. On the other hand, the radial pressure must not be so high that the insert becomes ruined, particularly as regards ruining the substrate of the catalyst or Diesel particle filter sensitive to pressure loading. In addition to this, there is a need to engineer inserts with a reduced mass so that they attain the required temperature quicker in vehicle operation. Such substrates are structured for example in the form of a corrugated board type basic structure coated with a catalytic material.

Hitherto, the insert was inserted and clamped in place in the outer housing, i.e. canned, by wrapping the sheet metal jacket about the insert into a tube with or without subsequent calibrating or closing of shells. But when the force is applied excessively the insert, in other words the substrate of catalysts can be ruined.

One major difficulty in fabricating emission control devices is that the elastic compensating element disposed between the substrate and the outer housing is typically provided as support matting ensuring a permanently biased pressure compensation. The drawback of this support matting is, however, that after it is compressed it is subject to a certain settling (relaxation) resulting in the pressure transmitted thereby to the substrate being reduced. The rebound or spring-back of the outer housing after insertion and clamping in place also results in the pressure initially applied to the substrate and thus the applied clamping force being diminished. In addition to this, the pressure holding the support matting in place in operation deteriorates (for instance due to aging) resulting in the initial pressure needing to be increased even more to ensure the substrate is reliably clamped in place in the outer housing later, stressing the individual substrates to the limit of their stability.

SUMMARY

This is achieved by the following steps in the method: firstly by deforming each insert inwardly as predetermined by exerting a pressure at its circumference, then determining from the resulting values the wanted deformation of each insert needed to attain a wanted pressure and then fitting the insert in an outer housing, the internal dimensions of which correspond to the outer dimensions of the insert as resulting from the wanted deformation.

In methods as known hitherto the outer housing is plastically deformed by a predefined displacement by a predefined force which is always maintained constant, i.e. irrespective of the loading capacity of the insert as just installed. Now, the invention takes a different approach in that firstly the compression of the insert, particularly of the support matting is first determined to then adapt the outer housing to the clamping force as needed to attain the wanted compression. In other words, a force oriented laterally inwards and thus a corresponding pressure is now exerted on each insert.

In accordance with a first embodiment of the invention it is now provided for that each insert is exposed at its circumference to an inwardly acting predefined pressure and the wanted deformation is determined in that the elastic deformation of the insert is measured at least on attaining the predefined pressure. In other words, an increasing pressure is applied, and it is sensed concurrently to what extent the insert is elastically deformed at the pressure applied at the time. Since the elastic deformation is specific to the insert concerned a family of different deformation values is sensed for each insert. The wanted deformation and thus the wanted pressure can then be determined in two different ways in being a predefined pressure which depending on the necessary maintained pressure is more or less just below the pressure value as of which the insert is plastically deformed and thus ruined.

A first variant for determining the wanted deformation is provided for pressurizing the insert with the wanted pressure to then define so-to-speak the "jounce" of the substrate, i.e. the wanted deformation and thus the outer dimensions of the insert for attaining the wanted pressure.

Once the wanted deformation has been determined for a specific insert, the corresponding inner dimensions of the outer housing to be applied can be determined without undue complications.

In the concluding step in the method the outer housing is mounted on the prefabricated assembly whereby the inner dimensions of the outer housing correspond to the outer dimensions of the insert for the wanted deformation as established. In other words, via the measuring device by which the pressure is applied, the later pressure of the outer housing is simulated and then, and not before, the outer housing fabricated or selected tailored as a function of the sensed values.

In accordance with a second particularly preferred variant it is provided for in determining the wanted deformation that the predefined exerted pressure is lower than the wanted pressure and the wanted deformation. The wanted deformation needed to attain this wanted pressure is then established in a controller in that the deformation of the insert as sensed on application of the pressure is extrapolated to arrive at the wanted deformation. In this arrangement the deformation can be sensed with a continually increasing pressure or, as an alternative, it can of course also be sensed at a few known pressure values from which the result is extrapolated.

This variant in which the applied pressure is preferably significantly below the wanted pressure offers the advantage as compared to the first-mentioned method (insert already exposed to the wanted pressure) that a loss in pressure due to multiple compression of the support matting is avoided or at least limited by establishing namely that the matting, every time it is compressed, is subject to a certain settling, in other words a plastically deformation as a result of which the maintained pressure exerted by the matting is also reduced. When thus the support matting is exposed to the wanted pressure before the outer housing is fitted (where necessary, even several times) and the wanted deformation determined therefor then a later reliable clamping in place of the insert in the outer housing designed just to this wanted deformation is no longer assured under circumstances since the maintained pressure of the matting has become reduced by the multiple compression. A similar loss of pressure also occurs, incidentally when for compensating a possible "jounce" of the outer housing the matting is "overcompressed", in other words pressurized beyond the wanted pressure whereas when a pressure is exerted significantly below the wanted pressure on the insert which is just sufficient to permit extrapolating the (further) profile of the pressure/deformation characteristic with sufficient accuracy, the effect as described can be avoided, or at least greatly diminished.

As an alternative to exerting a predefined pressure on the insert and sensing the resulting deformation it is also possible that a predefined deformation is produced with the insert by exerting an inwardly acting pressure and the wanted deformation is determined in that the pressure needed to attain the predefined deformation is measured on the insert. This predefined deformation may be a deformation by a certain amount (i.e. the diameter of any insert variable within a certain limit is reduced by a constant predefined value) or it may be a deformation to a predefined value, namely a predefined diameter. Sensing the pressure in this case is, of course, also to be understood as sensing—for example with the aid of a load cell—the force needed, from which then (in taken into account the surface area of the load cell) a direct indication of the pressure can be ascertained.

In a particularly preferred embodiment of the invention it is also provided for that the predefined exerted pressure is lower than the wanted pressure and the wanted deformation is extrapolated from the pressure exerted at the predefined deformation. In this arrangement the predefined deformation to be selected as low as possible; to advantage just enough to achieve a sufficiently precise extrapolation of the pressure deformation response of the particularly insert concerned in, for one thing, preventing damage of the sensitive insert and, for another, in avoiding or at least limiting the loss of pressure due to multiple compression of the support matting as already explained in conjunction with the pressure controlled method. For determining the deformation to be achieved a variety of parameters can be made use of, including, among other things, taking into account the compression of the support matting. When, for example, an insert having a round cross-section is deformed to a predefined diameter, this diameter can be computed as the sum from the substrate diameter and twice the thickness of the non-compressed matting, less a constant valid for all components of a series.

To further optimize later clamping in place of the insert in the outer housing, extrapolation of further parameters can be taken into account, involving particularly with e.g. wrapped housing the rebound of the outer housing after closure or the expansion of the housing (where a prefabricated cylindrical outer housing is concerned into which the insert is inserted). But also the insulating effect of the compensating element changes as a function of the compression and thus needs to be taken into account. It is furthermore of advantage to take into account the change in shape of the housing with change in temperature (unavoidable in operation of the emission control device); it being particularly straight housings having an out of round cross-section tending to "become round". When this tendency is taken into account in tailoring the dimensions of the outer housing for the insert concerned, by, for instance, dimensioning an oval housing somewhat longer, pressure concentrations in the region of a smaller radius can be avoided. In this way the substrate is stressed less, resulting in fewer fabrication rejects and enhanced durability.

As already explained above, preferably the insert is a prefabricated insert having a gas-permeable substrate and an elastic compensating element, preferably a support matting, surrounding the circumference of the substrate.

The device fabricated by the method in accordance with the invention is in accordance with one preferred embodiment an exhaust gas catalyst, a Diesel particle filter, both provided with an unstable substrate as the core of the insert.

The pressure exerted on the insert is normally oriented radially inwardly, this of course depending on the shape of the outer housing which, as already indicated, must not necessarily be regular cylindrical in cross-section but may also be out of round.

Although it is technically possible to work with just one pressure cheek or jaw exerted against the insert with the predefined pressure, preferably at least three pressure jaws are provided moved relative to the insert.

At least one sensing point for determining the displacement and/or the applied pressure is provided, the displacement being that travelled by the corresponding pressure jaws from first contact of the insert up to application of the wanted predefined pressure. Via the displacement, the inner dimensions of the outer housing are determined. As an alternative, as already explained, the displacement can be defined which defines the deformation of the insert and at which the corresponding pressure is sensed.

The housing is engineered particularly as a sheet metal housing.

The method in accordance with the invention can be applied to all methods as known to date for fabricating exhaust gas handling devices.

A first method is the so-called wrapping method in which a piece of sheet metal is wrapped around the insert and then once the inner dimensions have been obtained is secured and closed at its edges.

A second method is calibration in which the prefabricated tube is pressed from without at the circumference against the insert for plastic deformation thereof.

A third method involves a housing consisting of a plurality of shells pressed against the insert and secured to each other.

A fourth embodiment provides for a so-called plugging method in which a plurality of cylindrical housings are prefabricated differingly in inner dimensions. In the third step in the method the inner dimension of the housing is first established as wanted for the desired pressure, before the housing is used with the corresponding dimensions for plugging the insert into the housing. As an alternative the housing can be fabricated individually in a tailored manner with the optimum diameter as established by pressure and displacement sensing and computation.

The method in accordance with the invention is directed particularly at inserts engineered to take a wanted pressure of max. 7 bar, preferably even less than 3.9 bar.

BRIEF DESCRIPTION OF THE DRAWINGS

Further features and advantages of the invention read from the following description and the attached drawings to which reference is made and in which.

DETAILED DESCRIPTION OF THE DRAWINGS

Figure 1:
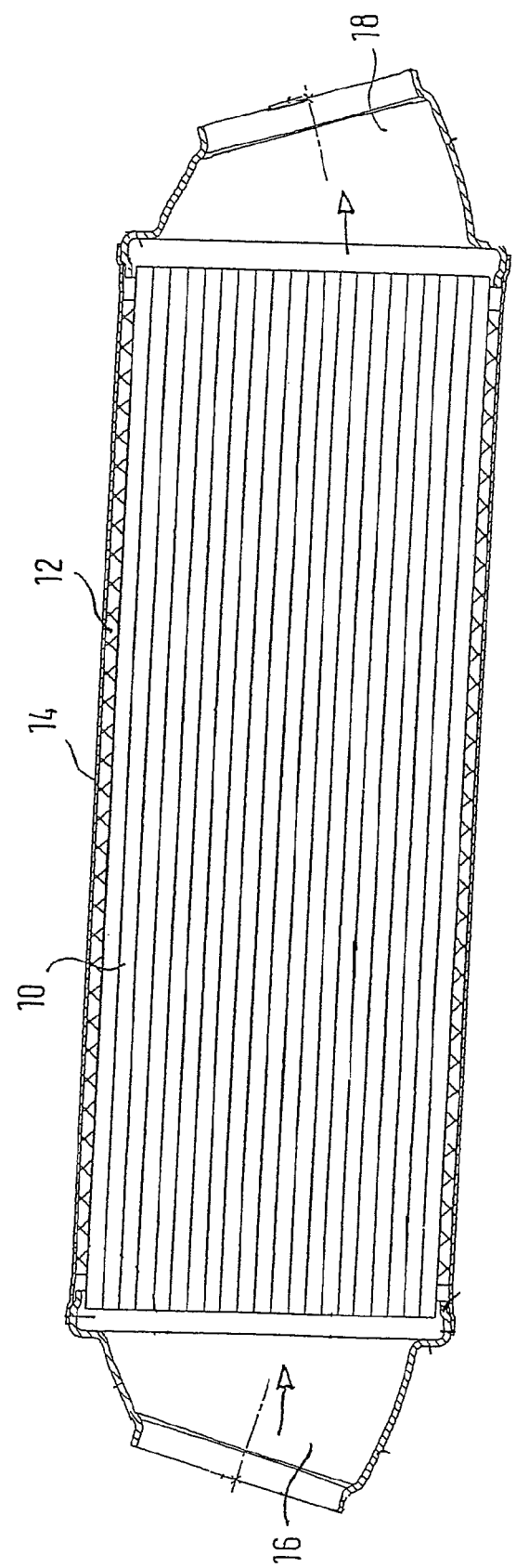
FIG. 1 is a longitudinal section view through a device in the form of an emission control device fabricated by the invention.

Referring now to FIG. 1 there is illustrated an automotive exhaust gas handling device in the form of an emission control device. The emission control device is either an exhaust gas catalyst or a Diesel particle filter or a combination of both.

The core item of the emission control device is an elongated cylindrical substrate 10 comprising, for example, a ceramic substrate or a kind of wrapped corrugated board or some other catalytic substrate or filter material with or without a coating. The substrate 10 may feature a regular cylindrical cross-section or a cross-section out of round, it being only for the sake of a simplified illustration that a regular cylindrical cross-section is shown in the FIGs. The substrate is surrounded by a support matting 12 acting as an elastic compensating element between the substrate 10 and the outer housing 14. The outer housing 14 is made very thin-walled, particularly of sheet metal. Connected upstream and downstream of the outer housing 14 is an inflow funnel 16 and outflow funnel 18 respectively.

The substrate 10 forms together with the support matting 12 a prefabricated assembly, termed insert in the following.

In operation, exhaust gas flows through the inflow funnel 16 at one end into the substrate 10 and leaves the substrate 10 at the other end via the outflow funnel 18 of the emission control device with fewer noxious components.

Fabrication of the emission control device will now be explained with reference to FIGS. 2 to 4.

Figure 2:
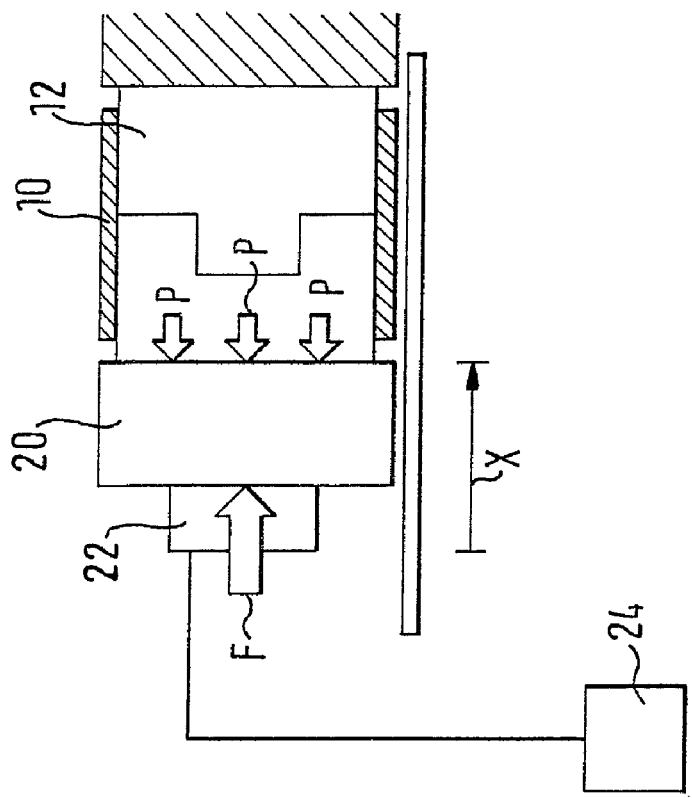
FIG. 2 is diagrammtic view of a sensing tool used in the method in accordance with the invention.

Referring now to FIG. 2 there is illustrated a measuring device for determining the resiliency of each insert in series production before canning, i.e. fitting the insert in the outer housing 14. For this purpose the insert is inserted in the measuring device and radially inwards pressurized with an increasing pressure by at least one pressure jaw 20, preferably three thereof circumferentially disposed. Coupled to the pressure jaw 20 are load cells 22 which continually sense the force F applied. Via the force F the pressure acting inwards on the circumference of the insert can also be determined.

The force F applied to the insert is continually increased until a predefined pressure is attained. During action of the pressure jaws (cheeks) 20 the displacement is also continually sensed in parallel to the pressure. For example, from first contact of the support matting 12 up to action of the pressure jaw 20 in attaining the predefined pressure a displacement X is sensed. In this arrangement the predefined pressure can be the wanted pressure corresponding to the wanted deformation with which the insert is later to be clamped in place in the outer housing 14.

Preferably, however, as already explained above, sensing is terminated well below the wanted pressure $p_S$ and the pressure jaw 20 actioned up to the given lower predefined pressure $p_O$ to extrapolate from the sensed parameters the displacement $X_A$ (and thus the necessary wanted deformation) to achieve the wanted pressure $p_S$. For this purpose the measuring device is coupled to a corresponding controller 24.

Figure 3:
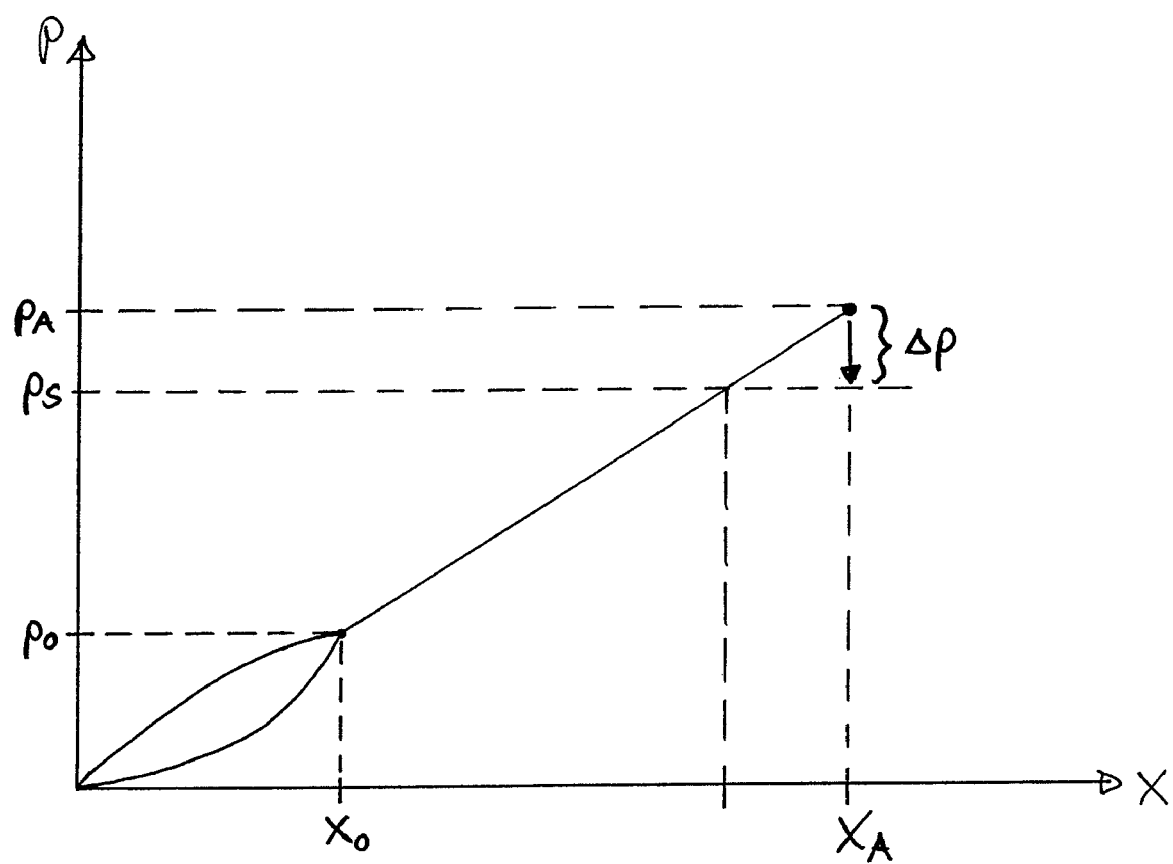
FIG. 3 is a pressure/displacement graph characteristical of the method in accordance with the invention.

Referring now to FIG. 3 there is illustrated diagrammatically the curve of the pressure p exerted on the insert as a function of the (actual or extrapolated) displacement X as already explained, the pressure exerted on the insert by the pressure jaw 20 is only the pressure $p_0$ corresponding to the displacement $X_0$ of the pressure jaw 20, this value $p_0$ having been defined prior as a function of the materials used for the insert and which is constant for all components of a series. In actioning the pressure jaws 20 a plurality of resulting values for the pressure p as a function of the displacement X is communicated to the controller 24, it being from these resulting values specific to each insert that the further profile of the pressure displacement characteristic for each insert is extrapolated in also taking into account the later rebound of the outer housing 14 as well as any further parameters and the reason for increasing the wanted pressure $p_S$ (as computed) by an amount $\Delta_p$. It is in this way that the pressure $p_A$ to be applied to the outer housing 14 is obtained as corresponding to the displacement $X_A$. This displacement $X_A$ defines the wanted deformation of the outer housing 14.

To extrapolate the pressure/displacement characteristic, instead of the pressure $p_0$ also the displacement $X_0$ of the pressure jaw 20 can be defined to a value constant for the series concerned. In this arrangement in actioning the pressure jaws 20 the pressure p is sensed as a function of the displacement X and communicated to the controller.

On release of the pressure jaws 20 the insert is removed from the measuring device and inserted in another device in which it is then inserted into the outer housing 14.

Figure 4:
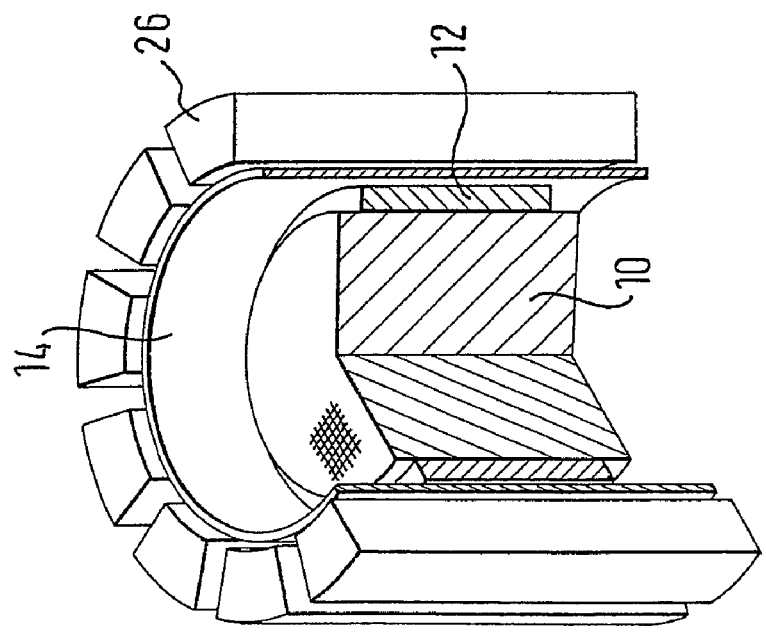
FIG. 4 is view in perspective of a calibrating tool shown partly in section as employed in the method in accordance with the invention.

Referring now to FIG. 4 there is illustrated one example of such a device as the calibrator. This comprises a plurality of circular segmental jaws 26 capable of being closed radially into a ring. The regular cylindrical tubular outer housing 14 into which the insert has been axially inserted is then inserted into the working space circumscribed by the jaws 26. The jaws 26 are then actioned radially inwards in taken into account the values as to the displacement $X_A$ saved in the controller 24, meaning that the wanted outer dimensions of the insert as established before by the controller 24 are attained by a controlled displacement of the jaws 26 with simultaneous plastic deformation of the outer housing 14. The prerequisite for this is, of course, that the insert was positioned in the outer housing 14 either with practically zero clearance or the clearance is taken into account in deformation. The pressure applied by the plastically deformed outer housing 14 on the insert thus corresponds (after resilience) to the wanted pressure $p_S$.

Instead of the jaws 26 as shown in FIG. 4 calibration can also be done by means of rollers urged to rotate against the outer housing locating the insert with a laterally predefined displacement $X_A$. Also possible in this context is actioning the outer housing 14 with the insert located therein relative to the predefined displacement $X_A$ against a single roller and then rotating the roller relative to the outer housing including the insert so that the roller is urged circumferentially into the outer housing to deform it plastically by the displacement $X_A$.

Figure 5:
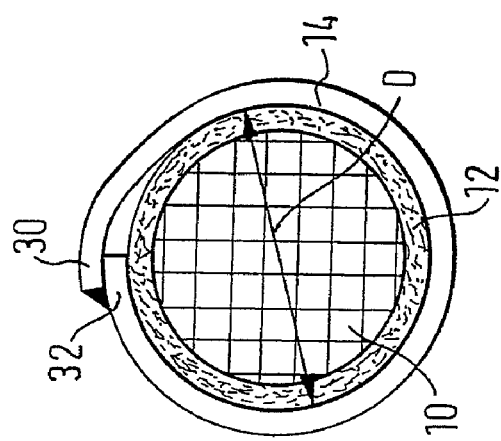
FIG. 5 is an end view of a device fabricated in accordance with the invention in a wrapped version of the outer housing.

Referring now to FIG. 5 there is illustrated how in addition to calibrating, wrapping the outer housing 14 can be done, simply showing the finished product. In this arrangement a strip of sheet metal is wrapped around the insert, this strip of sheet metal then forming the outer housing 14. The overlapping edges 30, 32 are welded together, i.e. after having being nested to such an extent that the inner dimension on the inside of the resulting outer housing 14 corresponds to the outer dimensions of the insert as sensed before with the measuring device. In the present case the outer dimensions and the inner dimensions of the outer diameter D of the insert compressed at the wanted pressure on the outside of the support matting 12 are reduced, where necessary, by an amount corresponding to the value $\Delta_p$ to compensate for the rebound of the welded outer housing 14.

In wrapping too, the sheet metal for the outer housing 14 is deformed with controlled displacement.

Figure 6:
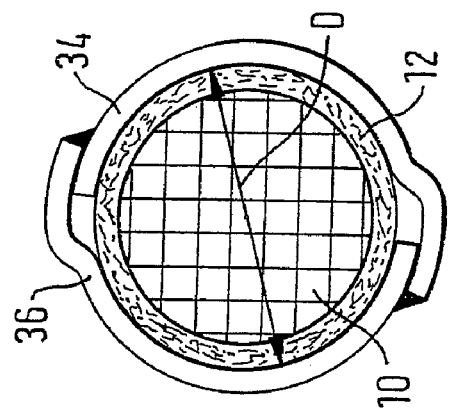
FIG. 6 is an end view of a device fabricated in accordance with the invention in a shell version of the outer housing.

Referring now to FIG. 6 there is illustrated an embodiment which works with two or more nested shells 34, 36. Here too the shells 34, 36 are nested with controlled displacement until the inner dimensions corresponding to the outer dimensions (in this case the outer diameter D) of the insert. The shells 34, 36 are then e.g. welded, seamed or soldered together, here again in taking into account compensation of rebound or expansion.

Figure 7:
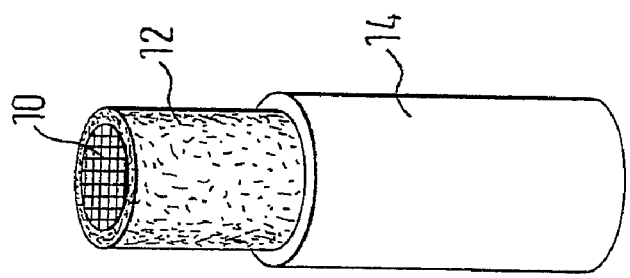
FIG. 7 is a rough drawing of the plug used as an alternative in the method in accordance with the invention.

Referring now to FIG. 7 there is illustrated diagrammatically a so-called plug. In the measuring device the wanted outer dimensions of the insert are established. Then a cylindrical tubular outer housing 14 is fabricated with the required diameter. This calibraing procedure can be sequenced in one or more work steps or in a continual process (e.g. rolling), after which the insert is plugged into the selected outer housing 14 axially, in, of course, making use of corresponding taper funneled expedients for radial precompression. The expansion (flaring) of the outer housing 14 during plugging is compensated the same as for the procedure describing rebound in determining the wanted deformation.

By the method as described, highly fragile substrates 10 can now be safely fitted at wanted pressures of max. 7 bar or preferably even below 3.9 bar.

It is to be emphasized that the method as described is not intended just for test purposes in which a single catalyst or Diesel particle filter is fabricated, but instead is specifically intended for mass production in which each and every substrate including the support matting or corresponding insert is previously pressurized and sensed.

The invention claimed is:

1. A method of fabricating emission control devices each of which comprises an outer housing with an insert clamped in place therein, the method comprising:
    a) deforming each insert inwardly by exerting a predefined pressure at its circumference,
    b) determining from the deforming step a wanted deformation of each insert needed to attain a wanted pressure,
    c) fitting the insert in an outer housing, the internal dimensions of which correspond to the outer dimensions of the insert as resulting from the wanted deformation, wherein a predefined deformation is produced with the insert by exerting an inwardly acting pressure and the wanted deformation is determined in that the pressure needed to attain the predefined deformation is measured on the insert, and wherein the predefined exerted pressure is lower than the wanted pressure and the wanted deformation is extrapolated from the pressure exerted at the predefined deformation.

2. The method as set forth in claim 1, wherein each insert is exposed at its circumference to an inwardly acting predefined pressure and the wanted deformation is determined in that the elastic deformation of the insert is measured at least on attaining the predefined pressure.

3. The method as set forth in claim 2, wherein the predefined exerted pressure is the pressure at which the insert is subjected to the wanted pressure.

4. The method as set forth in claim 2, wherein the predefined exerted pressure is lower than the wanted pressure and the wanted deformation is extrapolated from the deformation on application of the predefined pressure.

5. The method as set forth in claim 4, wherein at least one of the following parameters is taken into account in extrapolation: resiliency of the housing, expansion of the housing, change in shape of the housing with change in temperature, change in the insulating effect of the compensating element as a function of compression.

6. The method as set forth in claim 1, wherein the insert is a prefabricated insert having a gas-permeable substrate and an elastic compensating element surrounding the circumference of the substrate.

7. The method as set forth in claim 1, wherein the device is an exhaust gas catalyst, a Diesel particle filter or a combination of both.

8. The method as set forth in claim 1, wherein the pressure exerted on the insert is oriented radially inwardly.

9. The method as set forth in claim 1, wherein at least one pressure cheek is moved relative to the insert to exert the wanted pressure or wanted deformation on the insert in a measuring device.

10. The method as set forth in claim 1, wherein the geometry of the outer housing is changed controlled in displacement that it clamps the insert in the outer housing (14) at the wanted pressure.

11. The method as set forth in claim 1, wherein a sheet metal housing is used as the outer housing.

12. The method as set forth in claim 1, wherein the outer housing is generated by wrapping about the insert.

13. The method as set forth in claim 1, wherein the outer housing is pressed against the insert by calibrating.

14. The method as set forth in claim 1, wherein the outer housing consists of a plurality of shells pressed against the insert and secured to each other.

15. The method as set forth in claim 1, wherein the insert is inserted into a prefabricated cylindrical outer housing, the internal dimensions of which correspond to the outer dimensions of the insert as measured.

16. The method as set forth in claim 15, wherein the outer housing is calibrated to the wanted diameter.

17. The method as set forth in claim 1, wherein the wanted pressure exerted on the insert is maximally 7 bar, preferably maximally 3.9 bar.

18. A method of fabricating an emission control device comprising an insert received within an outer housing, the method comprising the steps of:
    a) deforming the insert inwardly by exerting a predefined initial pressure against an outer circumference of the insert;
    b) determining a final deformation to achieve a final pressure by measuring the pressure on the insert needed to attain a predefined initial deformation, wherein the predefined initial pressure is lower than the final pressure and the final deformation is extrapolated from the pressure exerted at the initial deformation; and
    c) fitting the insert in an outer housing and producing an internal dimension of the outer housing that corresponds to an outer dimension of the insert resulting from the final deformation.

19. The method as set forth in claim 18, wherein step a) includes generating a plurality of pressure values as a function of deformation, and step b) includes extrapolating a pressure displacement characteristic for the insert based on the plurality of pressure values; and including increasing the final pressure by an amount determined from the pressure displacement characteristic to achieve the final deformation.

20. The method as set forth in claim 19 including taking into account a subsequent rebound of the outer housing when determining the pressure displacement characteristic.

* * * * *